United States Patent [19]
Kuchel

[11] Patent Number: 5,106,194
[45] Date of Patent: Apr. 21, 1992

[54] METHOD AND APPARATUS FOR ABSOLUTE INTERFEROMETRIC TESTING OF PLANE SURFACES

[75] Inventor: Michael Kuchel, Oberkochen, Fed. Rep. of Germany

[73] Assignee: Carl-Zeiss-Stiftung, Heindenheim/Brenz, Fed. Rep. of Germany

[21] Appl. No.: 648,199

[22] Filed: Jan. 31, 1991

[30] Foreign Application Priority Data

Feb. 2, 1990 [DE] Fed. Rep. of Germany ....... 4003100

[51] Int. Cl.$^5$ ............................................... G01B 9/02
[52] U.S. Cl. ..................................... 356/360; 356/359; 356/371
[58] Field of Search ........................ 356/371, 360, 359

[56] References Cited

U.S. PATENT DOCUMENTS 4,859,061 8/1989 Inoue ..................... 356/359

FOREIGN PATENT DOCUMENTS 3443175 6/1985 Fed. Rep. of Germany .

OTHER PUBLICATIONS

"Ein Interferenzverfahren zur Absolutprufungvon Planflachennormalen I", by J. Schwider, G. Schulz, R. Riekher and G. Minkwitz, "Optical Acta", vol. 13, Issue 2, pp. 103-119 (1966).
"Ein Interferenzyerfahren zur Absolutprufung von Planflachennormalen II", by J. Schwider, "Optica Acta", vol. 14, Issue 4, pp. 389-400 (1969).
"Absolute Calibration of an Optical Flat", by Bernard S. Fritz, "Optical Engineering", vol. 23, No. 4, pp. 379-383, (Jul.-Aug. 1984).
"Absolute Measurement of Flat Mirrors in the Ritchey-Common Test", by F. M. Kuchel, from "Summaries of Papers Presented at the Optical Fabrication and Testing Workshop", Seattle, Washington, pp. 114-119, (Oct. 21-23, 1986).

Primary Examiner—Samuel A. Turner
Assistant Examiner—Richard E. Kurtz, II
Attorney, Agent, or Firm—Eugene Stephens & Associates

[57] ABSTRACT

A relatively simple interferometric method for the absolute testing of plane surfaces is disclosed, along with special apparatus for carrying out the inventive method. Two plane surfaces to be tested ($A_6, B_6$) are inserted simultaneously into the interferometer's measuring-beam path so that the measuring beam is reflected from each plane surface at two respective and different incident angles ($\alpha, \beta$). During successive steps, the plane surfaces ($A_6, B_6$) are angularly repositioned and shifted so that at least one of the incident angles ($\alpha, \beta$) is changed. Interferograms are recorded during each step and analyzed mathematically.

14 Claims, 4 Drawing Sheets

METHOD AND APPARATUS FOR ABSOLUTE INTERFEROMETRIC TESTING OF PLANE SURFACES

TECHNICAL FIELD

The invention relates to a method and an apparatus for absolute interferometric testing of plane surfaces where interfering wavefronts created by an interferometer are recorded and analyzed.

BACKGROUND

Interferometric measuring procedures can provide a highly accurate analysis of sample surfaces. Computer-assisted analysis of interferograms allows measuring resolutions perpendicular to the sample surface better than approximately 1:100 of the measuring-light's wavelength. However, interferometry can determine only relative differences between two sample surfaces. Absolute testing, i.e., the comparison of a sample surface relative to a mathematical plane, requires calibration of the interferometer so that deviations of the measuring surface itself, relative to the mathematical plane, are known with appropriate accuracy.

A known method for absolute testing of plane surfaces has been described by J. Schwider et al. in "Optica Acta," Volume 13, Issue 2, pages 103-119 (1966), and by J. Schwider, in "Optica Acta," Volume 14, Issue 4, pages 389-400 (1967). It is based on the classical procedure of measuring double combinations of three plane surfaces in a Fizeau interferometer relative to each other where the plane surfaces are the reflectors of the interferometer. However, this method is limited by a reflectance problem relating to the inversion of the plane surfaces relative to the coordinate system of the recording camera, and absolute testing is possible only along a central straight line.

The just-named authors have improved this testing procedure to the extent that absolute testing of plane surfaces relative to a suitably selected mathematical plane may be carried out successively along as many central straight lines as desired and even along eccentric straight lines. To accomplish this, the plane surfaces must be rotated and shifted repeatedly about their surface normal by suitable angles relative with respect to each other; and after each rotation or shifting, an interferogram must be displayed and analyzed. For example, eleven interference images are required in order to test a sample on six central and nine eccentric straight lines. However, while this method permits absolute testing of the plane surfaces on a grid of straight lines, between the straight lines there are always regions where the sample surfaces remain unknown. Also, this prior art method requires that, at all times, two of the three samples must be transparent at the wavelength of the measuring light. Furthermore, any inadvertent tilting of the plane surfaces during rotation or shifting leads to erroneous analytical values.

It has been suggested that the reflectance problem referred to above could be avoided by using an auxiliary mirror to measure a total of four plane surfaces relative to each other. A more detailed investigation, however, has shown that this suggested method also provides absolute testing only along a single straight line.

The reflectance problem does not occur when global polynominal graphs are used as a basis for plane surfaces, and such a method for the surface absolute testing of plane surfaces is described in "Optical Engineering," Volume 23, page 379 (1984). However, since a global polynominal graph acts as a low-pass filter, a loss of spatial resolution must be accepted when using this prior art method.

Another known method for surface absolute testing of plane surfaces is the Ritchey-Common test described by F. M. Kuchel in "Summaries of the Papers Presented at the Optical Fabrication and Testing Workshop," Oct. 21 to 23, 1986, Seattle, pages 114-119. Like the Twyman-Green interferometer, this method is based on the autocollimation principle. Wavefront disturbances caused by the interferometer are initially determined during three separate method steps. During two additional method steps, a sample surface is inserted in the divergent measuring-beam path of the interferometer at different incident angles, and another interferogram is recorded in each case. These five interferograms can then be used to calculate the deviations of the sample surface from a mathematical plane. However, this analysis requires extensive mathematical computation due to the fact that (a) the equidistant pixel grid of the camera is projected on the sample surface in a non-equidistant grid, (b) the pixel spacing of the projected grid also varies as a function of the incident angle, and (c) the relation between the measured wavefront disturbance and the deviation of the sample surface from a mathematical plane also varies across the diameter of the measuring beam. Because of the inclined incidence of the divergent measuring beam, this method requires an extremely time-consuming conversion, by local interpolation, between the pixels of a total of three different pixel grids.

Therefore, the invention herein is directed to providing an interferometric method which solves the problems identified above, and which achieves the absolute surface testing of plane surfaces with high spatial resolution and a minimum of mathematical computation.

SUMMARY OF THE INVENTION

This invention comprises a method wherein two surfaces to be tested are inserted simultaneously in the measuring-light path of an interferometer so that the measuring beam impinges on each of the two surfaces at a different incident angle, and the wavefront disturbances caused by the two plane surfaces are determined; thereafter, at least one of said incident angles is changed, and the wavefront disturbances are again determined.

According to the inventive method, the two plane surfaces to be tested are inserted in the interferometer at the same time; and the interferometer's two reflectors, i.e., the reference-beam reflector and the measuring-beam reflector, remain in their same orientation relative to each other, both as to distance and as to their respective virtual images which are projected onto the surface of the interferometer's sensor. Similarly, when the incident angle of the measuring beam is altered relative to each of the respective plane surfaces, the inventive method does not change the orientation of the virtual images of the two plane surfaces relative to each other. Therefore, the method of the invention eliminates the above-mentioned reflectance problem, and absolute surface testing is possible.

Absolute testing is carried out during at least three method steps in each of which an interferogram is recorded and used to prepare a phase diagram, i.e., a dot-matrix grid of the phase difference between the measuring beam and the reference beam. During a first method step, an interferogram of the empty interferometer is recorded, and a first phase diagram is prepared based solely on the relative positions of the reference-beam and measuring-beam reflectors. During a second step, the two plane surfaces to be tested are inserted in the interferometer's measuring-beam path, each plane surface being positioned at a different incident angle to the measuring beam, and a second phase diagram is prepared. During a third step, at least one of the two different incident angles is changed, and a third phase diagram is prepared. It should be noted that the order of these method steps is of no importance.

In many cases, an additional interferogram may still have to be prepared either (a) after one of the plane surfaces has been shifted, parallel to the incident plane, in the plane of the plane surface, or (b) after an incident angle has been changed a second time. This fourth interferogram is then used to prepare a fourth phase diagram.

A plurality of different methods is known for the preparation of said phase diagrams themselves, and none of these is discussed in detail here. A good overview of a number of these known methods, as well as their advantages and disadvantages, has been provided by B. Dorband's doctoral thesis, University of Stuttgart (1986), to which reference is made here. Depending on which known method is used, additional method steps may become necessary. For instance, if the phase diagrams are prepared by using a phase-stepping method, an additional time shift of the phase relation is required, e.g., by shifting the reference reflector along the optical axis.

When the interferometer has a telecentric measuring-beam path, the phase values of the first phase diagram can simply be deducted from the phase values of the remaining phase diagrams at each measured point, thereby eliminating the influence of the interferometer on these phase diagrams. Further analysis, i.e., the calculation of wavefront disturbances caused by a plane surface, requires only the solution of linear equation systems. This can be done with a computer using commercially available software.

The equation system to be solved is simplified when the incident angles of both plane surfaces are changed and when an integral multiple of the cosine of one incident angle corresponds to a different integral multiple of the cosine of the other incident angle. A local interpolation between the measured points is not required in this case. This applies also when the interferograms are recorded by a camera on a discrete pixel grid. However, since the statistical uncertainties used to determine wavefront disturbances increase with higher integrals of such multiples, the quotient of the integral multiple should be limited to a value of 2.

For reasons of symmetry, the change of the incident angles should be made by merely interchanging the incident angles. This can be accomplished by interchange of the two plane surfaces themselves. The wavefront disturbances of both plane surfaces are then determined with the same statistical uncertainty.

The incident angles selected may require additional steps in which the plane surfaces are also shifted laterally. Such shifting is often needed because the plane surface with the smaller incident angle, as a rule, is not completely illuminated. When this plane surface is shifted twice, once in each direction, with each shift being over a distance of one-half of the illuminated zone, it is assured that even the wavefront disturbances at the edge of the measuring zone can be determined with great statistical certainty. If a discrete pixel grid is used for plane testing, shifting should amount to an integral multiple of the pixel distance. Depending upon the deviation of the plane surfaces from a mathematical plane and upon the desired degree of accuracy, the shifting should deviate from an integral multiple of the pixel distance by less than 1/10th of the pixel distance.

Again for reasons of symmetry, it is recommended that, following the interchange of the incident angles, the second plane surface should also be shifted twice, the shift in each direction again being over a distance of one-half of the illuminated zone. When these further steps are taken, a total of seven interferograms are recorded. Possible tilting of the plane surfaces relative to each other (e.g., as a result of the shifting) can be calculated and taken into consideration when the wavefront disturbances by the plane surfaces are computed.

The inventive method may be carried out with a Michelson interferometer as well as with a Fizeau interferometer. However, a Fizeau interferometer permits a more compact design.

To carry out the inventive method, the usual interferometer base plate is provided with several positioning aids which can be used to position the plane surfaces and the interferometer reflector in the path of the measuring light during the individual method steps. The positioning aids comprise individual mounting units for carrying, respectively, the interferometer's measuring-beam reflector and each of the two plane surfaces to be tested. A plurality of track means are fixed to the base plate in predetermined locations. The track means can receive and hold respective ones of said mounting units in three-point mountings to assure high reproducibility of their relative positioning. With this special interferometer apparatus, the interferometer itself can be readily calibrated, and plane surfaces can be measured in an absolute manner. Further, one of the measured plane surfaces may thereafter be substituted for the interferometer's measuring-beam reflector for purposes of recalibration. The wavefront disturbance of all the surfaces are recorded and stored, and no special measures are required to assure the long-term stability of this interferometric arrangement.

When the apparatus of the invention is incorporated in a Fizeau interferometer, calibration may be facilitated if one of the two plane surfaces has a bar grid on it and if, depending on the incident angle, special reflection coefficients are selected for this bar-grid plane surface.

DETAILED DESCRIPTION OF PREFERRED EMBODIMENTS

Figure 1A:
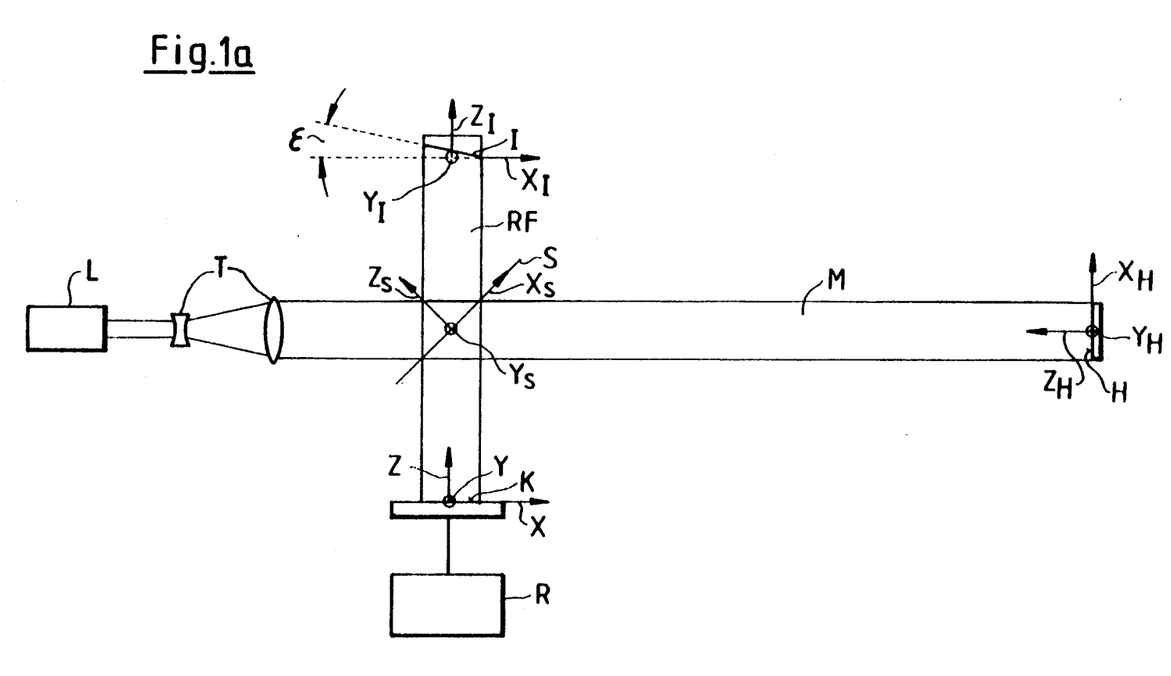
FIGS. 1a-1c schematically illustrate the optical path of a preferred interferometric arrangement for the absolute testing of plane surfaces according to the invention, each figure showing the arrangement modified for different method steps.

FIG. 1a shows, schematically, the optical path of a Michelson interferometer. A laser (L) generates a parallel light beam which is expanded by a telescope (T) and deflected by a beam splitter (S) into a measuring-beam path (M) and a reference-beam path (RF). A first interferometer reflector (I) reflects the reference-beam, and a second interferometer reflector (H) reflects the measuring-beam. Both optical paths, which are reflected back on themselves, are directed by beam splitter (S) to a camera sensor (K). Camera sensor (K) records a spatially resolved image resulting from the interference of the reference beam with the measuring beam, i.e., an interferogram.

The lengths of the optical paths of the reference beam (RF) and the measuring beam (M) are different. However, the difference between the path lengths is less than the coherence length of laser (L).

The interferometer reflector (I) in reference-beam path (RF) is tilted out of the vertical incidence by a small angle ($\epsilon$) (shown greatly enlarged). Therefore, even if all reflective surfaces in the optical path are absolutely flat, a spatial carrier frequency ($f_o$) will be modulated on the interferogram so that it will exhibit a periodic intensity distribution.

Actual plane surfaces, however, always differ slightly in elevation from the mathematical plane and thus produce spatial wavefront disturbances $\Phi(x,y)$. Therefore, the interferogram recorded by camera sensor (K) has an intensity distribution $$I(x,y) = a(x,y) + b(x,y) \cos [2\pi f_o x + \Phi(x,y)]$$

whereby it is assumed that camera sensor (K) is in the x,y plane and that the x axis is in the plane of the drawing. A computer (R) is used to compute the spatial wavefront $\Phi(x,y)$ by means of the 3-step algorithm described in the above-cited doctoral thesis by B. Dorband.

In FIG. 1a, each reflective plane surface (H,I,S) is associated with a right-handed coordinate system, the x axes of which are in the plane of the drawing and the z axes of which are parallel to each surface normal, respectively. The coordinate axes of each plane surface are provided with an index reference sign corresponding to the reference letter used to identify the respective plane surface. Hence, ($x_I$, $y_I$, $z_I$) represents the coordinate system of the reference-beam reflector (I); ($x_H$, $y_H$, $z_H$) represents the coordinate system of the measuring-beam reflector (H); and ($x_S$, $y_S$, $z_S$) represents the coordinate system of beam splitter (S).

The wavefront disturbance $\Phi(x,y)$ is composed additively of the wavefront disturbances of the individual plane surfaces:

$$\Phi(x,y) = \Phi(x_I,y_I) + \Phi_H(x_H,y_H) - 2\Phi_S(x_S,y_S) \quad [1]$$

with the proviso that the beam splitter (S) has only a single reflective surface.

Figure 1B:
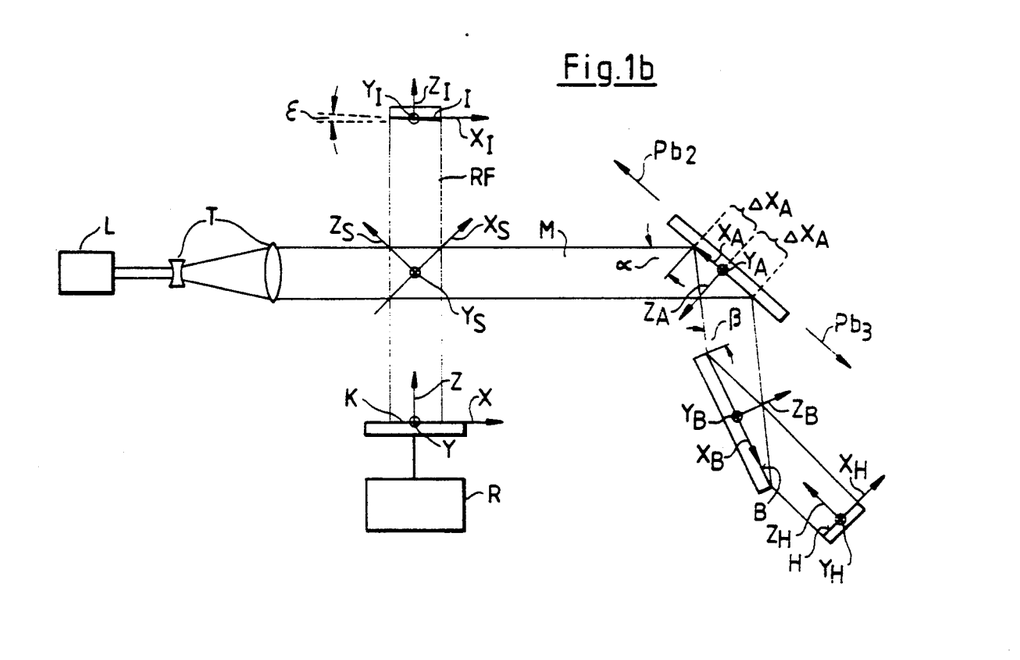
Figure 1C:
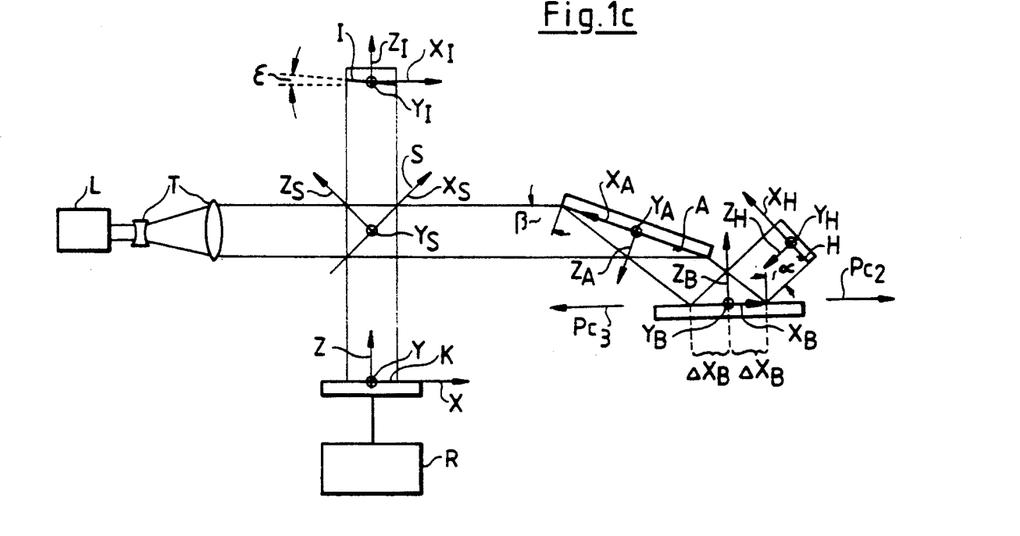

FIGS. 1b and 1c show modified arrangements of the same Michelson interferometer illustrated in FIG. 1a. Therefore, identical components have the same reference letters as in FIG. 1a. In FIGS. 1b and 1c, two plane surfaces (A,B) to be tested are arranged successively in the measuring-beam path (M) of the interferometer. In FIG. 1b, the measuring beam is reflected first at a first incident angle ($\alpha$) by the first plane surface (A) and thereafter at a second incident angle ($\beta$) by the second plane surface (B). The measuring beam (M) is then reflected back on itself by interferometer reflector (H). The path of the measuring light (M) in both FIGS. 1b and 1c is the same length as the measuring-beam path (M) of FIG. 1a.

In FIG. 1c both plane surfaces (A,B) have been rotated relative to their positions in FIG. 1b in such a manner that the measuring beam is reflected by first plane surface (A) at an angle ($\beta$) and by second plane surface (B) at an angle ($\alpha$).

Both plane surfaces (A,B) are also associated with a right-handed coordinate system ($x_A,y_A,z_A$) and ($x_B,y_B,z_B$), respectively, the z axes ($z_A,z_B$) of which are located perpendicular to each respective plane surface and the x axes ($x_A,x_B$) of which are located in the drawing plane parallel to each respective plane surface (A,B).

In each of the arrangements illustrated in FIGS. 1b and 1c, both plane surfaces (A,B) are inserted in the measuring-beam path at the same time, and the virtual images of the interferometer reflectors (H,I), as projected on camera sensor (K), remain in the same relative orientation as in FIG. 1a. Hence, there is no reflectance problem.

When the various components are positioned in each of the just-described arrangements, additional interferograms are recorded by camera sensor (K), and both plane surfaces (A,B) add further contributions $\Phi_A(x_A,y_A)$, $\Phi_B(x_B,y_B)$ to the total wavefront disturbance $\Phi(x,y)$. In the arrangement of FIG. 1b, the total wavefront disturbance is $$\Phi_{b1}(x,y) = \Phi_d(x,y) + \quad [2]$$
$$2\cos \alpha \, \Phi_A (x_A \cdot \cos \alpha, y_A) +$$
$$2\cos \beta \, \Phi_B (-x_B \cdot \cos \beta, y_B)$$

with the proviso that the positions at which the measuring beam is reflected by each plane surface (A,B) are a function of the respective incident angle ($\alpha,\beta$). That is, the wavefront disturbances $\Phi_A,\Phi_B$ of the two plane surfaces (A,B) describe the wavefront disturbances which would result between the respective plane surfaces with perpendicular angles of incidence. Therefore, as a result of incident angles ($\alpha,\beta$), values are obtained which are smaller by factors cos $\alpha$ and cos $\beta$, respectively. The factors "2" in equation (2) take into account the double reflection by each of the two plane surfaces (A,B).

Two more interferograms are recorded after first plane surface (A) has been shifted by a distance $\Delta x_A$ (corresponding to an integral multiple of the pixel pitch on the first plane surface in $x_a$ direction). First, a shift is made in the positive $x_A$ direction (arrow $P_{b2}$), then, in the negative $x_A$ direction (arrow $P_{b3}$). The total wavefront disturbances for these shifts are:

$$\Phi_{b2}(x,y) = \Phi_d(x,y) + \quad [3]$$
$$2\cos \alpha \, \Phi_A [(-\Delta x_A + x_A) \cdot \cos \alpha, y_A] +$$
$$2\cos \beta \, \Phi_B (-x_B \cdot \cos \beta, y_B)$$

after shifting in the direction of arrow ($P_{b2}$), and:

$$\Phi_{b3}(x,y) = \Phi_d(x,y) + \quad [4]$$
$$2\cos \alpha \, \Phi_A [(\Delta x_A + x_A) \cdot \cos \alpha, y_A] +$$
$$\cos \beta \, \Phi_B (-x_B \cdot \cos \beta, y_B)$$

after shifting the plane surface (A) in the direction of arrow (Pb$_3$).

When the apparatus is positioned in the arrangement shown in FIG. 1c, three additional interferograms are recorded by camera sensor (K) and analyzed by computer (R). However, this time it is the second plane surface (B) which is similarly shifted along its $x_B$ axis between recordings, again by a distance $\Delta x_B$ which corresponds to an integral multiple of the pixel pitch on second plane surface (B) in the $x_B$ direction.

Taking into consideration the now interchanged incident angles, the measured wavefront disturbances in the plane of camera sensor (K) result, respectively:

$$\Phi_{c1}(x,y) = \Phi_d(x,y) + \qquad\qquad [5]$$
$$2\cos\beta\ \Phi_A\ (x_A \cdot \cos\beta,\ y_A) +$$
$$2\cos\alpha\ \Phi_B\ (-x_B \cdot \cos\alpha,\ y_B)$$

in the not shifted case;

$$\Phi_{c2}(x,y) = \Phi_d(x,y) + \qquad\qquad [6]$$
$$2\cos\beta\ \Phi_A\ (x_A \cdot \cos\beta,\ y_A) +$$
$$2\cos\alpha\ \Phi_B\ [(-\Delta x_B - x_B) \cdot \cos\alpha,\ y_B]$$

after shifting in the direction of arrow (P$_{c2}$) ($+x_B$ direction); and $$\Phi_{c3}(x,y) = \Phi_d(x,y) + \qquad\qquad [7]$$
$$2\cos\beta\ \Phi_A\ (x_A \cdot \cos\beta,\ y_A) +$$
$$2\cos\alpha\ \Phi_B\ [(\Delta x_B - x_B) \cdot \cos\alpha,\ y_B]$$

after shifting in the direction of arrow (P$_{c3}$) ($-x_B$ direction).

Figure 1D:
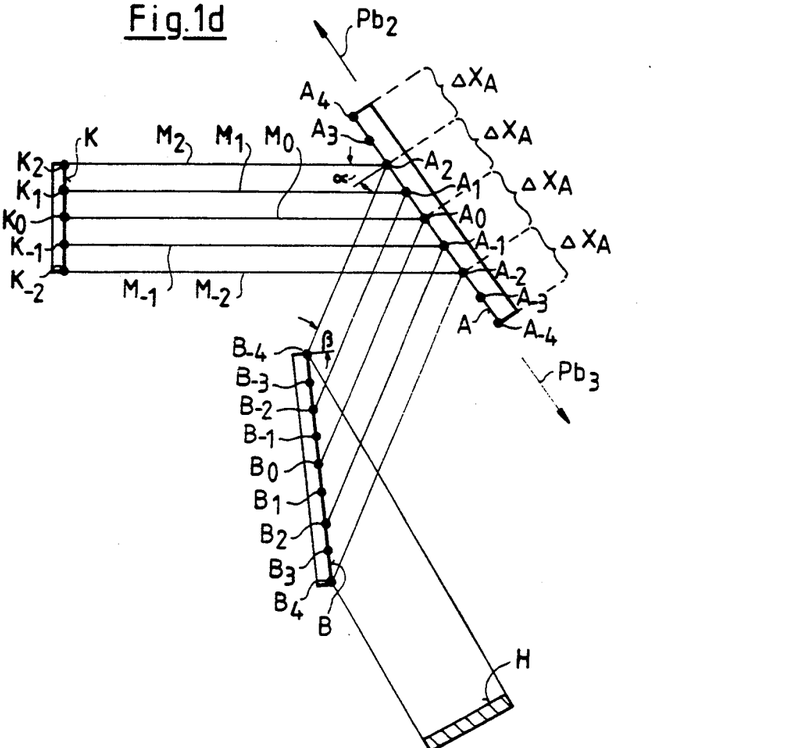
FIG. 1d is a more detailed, but still simplified, schematic illustration of the measuring-beam path of FIG. 1b.

Further analysis takes place by solving this equation system with respect to contributions $\Phi_A$ and $\Phi_B$ for the wavefront disturbances of both plane surfaces (A,B). This analysis is simplified by the selection of the incident angles ($\alpha,\beta$). They are selected in such a manner that $\cos\alpha = 2\cos\beta$. An image of the discrete pixel grid of camera sensor (K) is thereby formed on discrete pixel grids on the plane surfaces (A,B) which are identical on both plane surfaces and during all steps. This is illustrated by the detail drawings of FIGS. 1d and 1e which show examples of five discrete pixels (K$_{-2}$) to (K$_2$) of camera sensor (K) in the x direction. As shown in FIG. 1d, the light rays (M$_{-2}$, M$_{-1}$, M$_0$, M$_1$, M$_2$) generate a pixel-by-pixel image of the even-numbered pixels (B$_4$, B$_2$, B$_0$, B$_{-2}$, B$_{-4}$) of second plane surface (B), via the central pixels (A$_{-2}$, A$_{-1}$, A$_0$, A$_1$, A$_2$) of first plane surface (A), on the pixels (K$_{-2}$, K$_{-1}$, K$_0$, K$_1$, K$_2$) of camera sensor (K).

Next, first plane surface (A) is shifted by two pixels in the $x_A$ direction, which corresponds to one-half of the illuminated zone of this plane surface. After shifting in the direction of the arrow (Pb$_2$), an image of the pixels of this portion of plane surface (A), identified by an index smaller by 2 (i.e., pixels A$_{-4}$, A$_{-3}$, A$_{-2}$, A$_{-1}$, A$_0$), is generated on even-numbered pixels (B$_4$, B$_2$, B$_0$, B$_{-2}$, B$_{-4}$) of second plane surface (B) and on pixels (K$_{-2}$ - K$_2$) of camera sensor (K). Similarly, after shifting first plane surface (A) by two pixels in the direction of the arrow (Pb$_3$), an image of the pixels of first plane surface (A), identified by an index greater by 2 (i.e., pixels A$_0$, A$_1$, A$_2$, A$_3$, A$_4$), is generated on the same even-numbered pixels (B$_4$, B$_2$, B$_0$, B$_{-2}$, B$_{-4}$) of second plane surface (B) and on the pixels (K$_{-2}$ - K$_2$) of camera sensor (K).

Figure 1E:
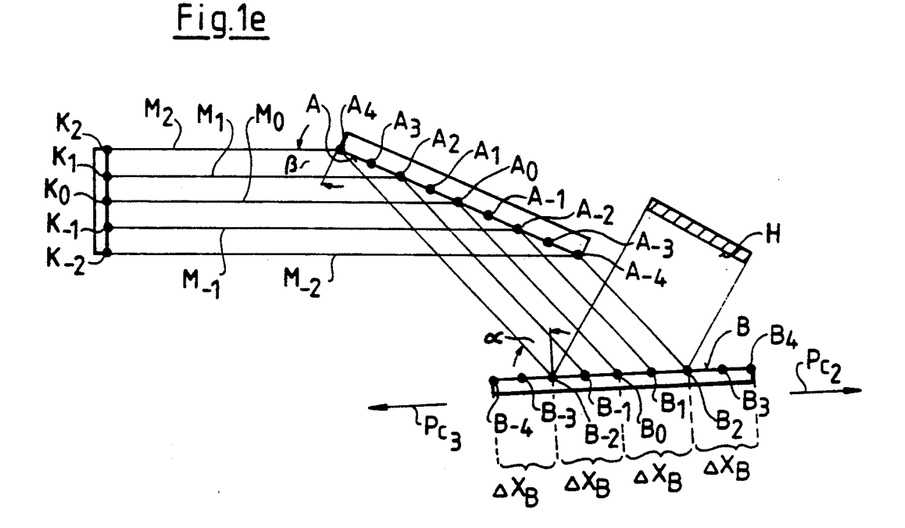
FIG. 1e is similar to FIG. 1d, but illustrating the measuring-beam path of FIG. 1c.

FIG. 1e shows the formation of an image of the pixels (K$_{-2}$, K$_{-1}$, K$_0$, K$_1$, K$_2$) of camera sensor (K) when the incident angles ($\alpha,\beta$) of the two plane surfaces (A,B) are interchanged. With this arrangement, an image of only the even-numbered pixels (A$_{-4}$, A$_{-2}$, A$_0$, A$_2$, A$_4$) of first plane surface (A) is generated.

It is essential that a distinct discrete pixel grid (A$_{-4}$ - A$_4$) and (B$_{-4}$ - B$_4$), respectively, be associated with the two plane surfaces (A,B) and that, when the interferograms are recorded, images of the points of these pixel grids be superimposed and projected on the pixels (K$_{-2}$ - K$_2$) of camera sensor (K). By this arrangement, an interpolation between pixels is not required.

The equation system consisting of the above-identified seven equations (equations [1] to [7]) may be expressed as follows:

$$\overrightarrow{F\ \Phi y} = \overrightarrow{\Delta\ \Phi y} \qquad\qquad [8]$$

The error matrix (F) then is a matrix with 4·m -2 columns and 6·m lines, where m represents the number of pixels of camera sensor (K) in the x direction. Vector $\Phi y$ lists the wavefront disturbances ($\Phi A$, $\Phi B$) of both plane surfaces (A,B) between each other for 2 m $-$ 1 pixels in the $x_A$ and $x_B$ directions, respectively. Line vector $\Delta\Phi y$ lists the corresponding wavefront disturbances:

$$\Delta\Phi_{b1}=\Phi_{b1}-\Phi_a,\ \Delta\Phi_{b2}=\Phi_{b2}-\Phi_a,$$
$$\Delta\Phi_{b3}=\Phi_{b3}-\Phi_a,$$

$$\Delta\Phi_{c1}=\Phi_{c1}-\Phi_a,\ \Delta\Phi_{c2}=\Phi_{c2}-\Phi_a,\ \Delta\Phi_{c3}=\Phi_{c3}-\Phi_a,$$

for m pixels of camera sensor (K) in the x direction (i.e., a total of 6 m values). The values of vectors $\Phi_y$ and $\Delta\Phi_y$ must all be taken at the same y values.

The linear equation system [8] must be solved for each column of camera sensor (K) in y direction. With a commercially available CCD camera having 512×512 pixels, the equation system must be solved 512 times. However, the error matrix (F) is not a function of x and y and thus represents a constant. The individual coefficients of (F) are either 0, $\cos\alpha$ or $\cos\beta$.

By multiplying the equation system [8] with the transposed error matrix (F$^T$) and the matrix (F$^T$F)$^{-1}$, which is inverse to (F$^T$F), the solution is $$\overrightarrow{\Phi y} = (F^T F)^{-1} F^T \overrightarrow{\Delta\Phi} = G \overrightarrow{\Delta\Phi y}$$

with the weighted matrix (G).

The constant weighted matrix (G) is stored in computer (R), thereby permitting a fast computation of wavefront disturbances $\Phi_A(x_A,y_A)$, $\Phi_B(x_B,y_B)$ in all points $(x_A,y_A)$ of first plane surface (A), and in all points $(x_B,y_B)$ of second plane surface (B).

With wavefront disturbances $\Phi_A(x_A,y_A)$ in points $(x_A,y_A)$, the deviations $\Delta Z_A$ of first plane surface (A) in the $Z_A$ direction from a mathematical plane, can be computed with the equation $$2\times 2\ \pi\Delta z_A(x_A,Y_A)/\lambda = \Phi_A(x_A,y_A)$$

when wavelength $\lambda$ of the laser (L) is known.

The same applies to deviations $\Delta z_B(x_B,y_B)$ of the second plane surface (B).

The square root of the sum of squares of the coefficients of one line of the weighted matrix (G) is a measurement of the statistical uncertainty with which wavefront disturbances ($\Phi_A$) and ($\Phi_B$) are determined. Inasmuch as the weighted matrix (G) is the same for all columns of the camera sensor (K) in the y direction, the statistical uncertainty is not a function of the y value. It can be demonstrated that the statistical uncertainty in the center of first plane surfaces (A) is only slightly greater than the uncertainty exhibited by all the wavefront disturbances ($\Phi_{a1}$, $\Phi_{b1}$, $\Phi_{b2}$, $\Phi_{b3}$, $\Phi_{c1}$, $\Phi_{c2}$, $\Phi_{c3}$) in the center of the first plane surfaces (A). This uncertainty increases slightly at either end of the measuring range in the $\pm x_A$ direction. It can be demonstrated that substantial statistical errors are caused by uncertainties attributable to the wavefront disturbance $\Phi_a$ of the empty interferometer. These errors can be reduced considerably by repeated measurement of the wavefront disturbance $\Phi_a$.

Because of the symmetrical arrangement of the invention, the statistical uncertainty just discussed above applies equally to both first plane surface (A) and second plane surface (B).

By using the above-disclosed equation system [8], 4.m −2 unknowns for the wavefront disturbances of both plane surfaces (A,B) are computed for each column of camera sensor (K) in the y direction. A total of 6.m equations are available, i.e., the equation system is redundant. On the other hand, the solutions so far do not yet take into account a possible tilting of the plane surfaces (A,B) during shifting. Such tilting, however, would result in inaccurate measuring results. Therefore, the same analysis is carried out once again; however, now only the wavefront disturbances $\Delta\Phi_{b2}$, $\Delta\Phi_{b3}$, $\Delta\Phi_{c2}$, $\Delta\Phi_{c3}$ are used for analysis. If this second analysis provides different wavefront disturbances $\Phi_{A2}(x_A, y_A)$ or $\Phi_{B2}(x_B, y_B)$, tilting or length changes of the measuring-beam path (M) have occurred. The latter can be computed from the differences $\Phi_A(x_A, y_A) - \Phi_{A2}(x_A, y_A)$ and $\Phi_B(x_B, y_B) - \Phi_{B2}(x_B, y_B)$, respectively, where these differences must disappear when suitable tilting or length changes are taken into consideration. Each of the equations [2] to [7] may have added to the left side an additional phase surface to be determined in the form of a plane equation $r_i x + s_i y + t_i$, where the index i identifies the respective phase surface corresponding to each respective equation [2] through [7]. It should be understood that the coefficients $s_2$, $s_5$, $t_2$ and $t_5$ can be selected freely; that all remaining coefficients can be clearly determined mathematically; and that, due to the symmetry discussed above, a few coefficients are equal or have the same value with opposite signs.

Figure 2:
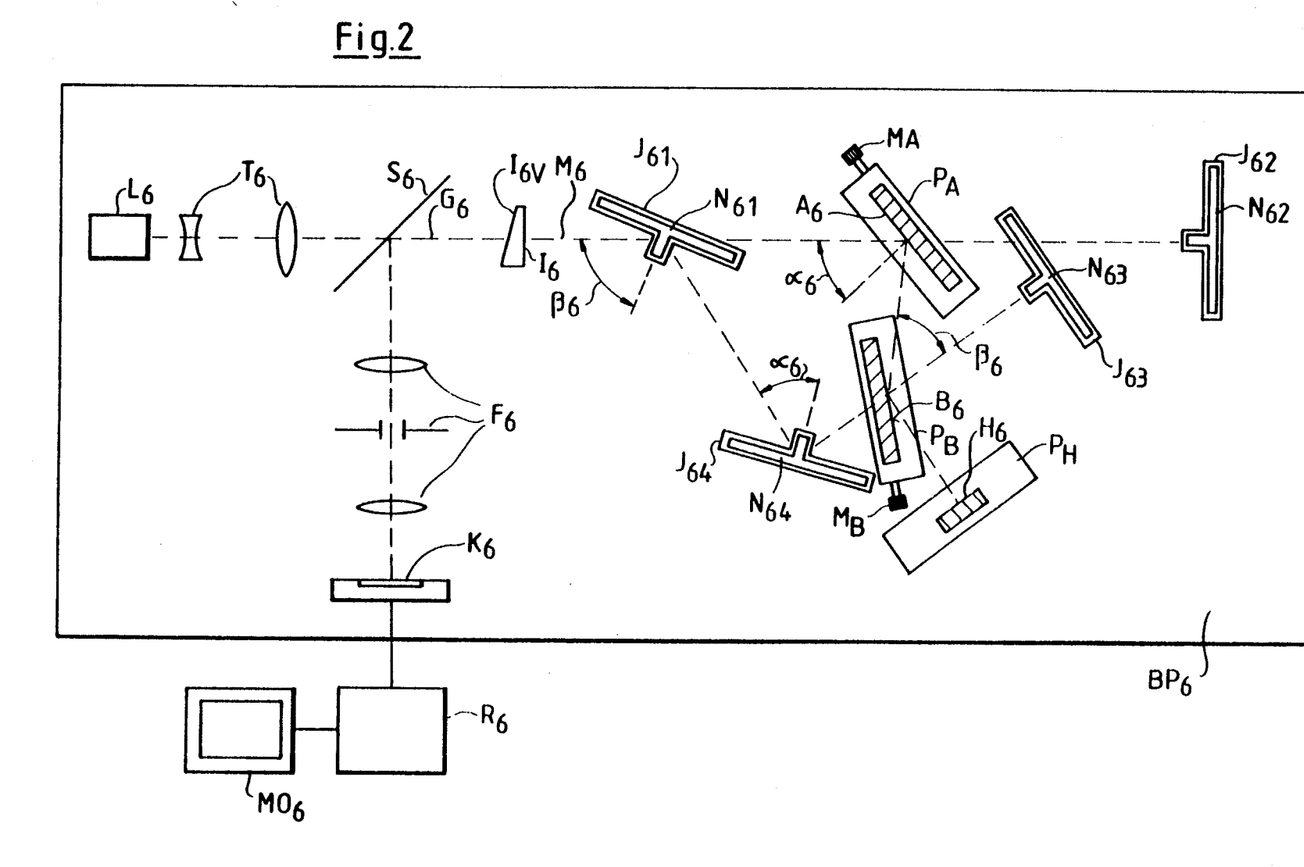
FIG. 2 is a schematic plan view of a Fizeau interferometer modified to carry out the inventive method for absolute testing of plane surfaces.

FIG. 2 shows a second preferred embodiment of apparatus for carrying out the inventor's method for absolute testing of plane surfaces. This second embodiment essentially comprises a Fizeau interferometer. Most of the components in this embodiment correspond to similar components illustrated in FIGS. 1a to 1e. Therefore, these similar components are identified with the same reference letters and numbers, accompanied by the additional index "6".

As different from a Michelson interferometer, the paths of the measuring beam and the reference beam in a Fizeau interferometer have a common range ($G_6$). The reference-beam reflector ($I_6$) is partially reflecting and has the shape of a wedge. A spatial frequency filter ($F_6$) is provided in front of the camera sensor ($K_6$) to filter out light reflected by the front surface ($I_{6v}$) of reflector ($I_6$).

The measuring process is analogous to that described in conjunction with FIGS. 1a to 1e. The topography of the plane surfaces ($A_6$, $B_6$) can be represented by a graph on a monitor ($MO_6$) after having been analyzed by a computer ($R_6$).

FIG. 2 shows the first plane surface ($A_6$) having an incident angle ($\alpha_6$), and the second plane surface ($B_6$) having an incident angle ($\beta_6$), in the path of the measuring beam ($M_6$). These two plane surfaces ($A_6$, $B_6$) as well as the interferometer reflector ($H_6$) are each fixed to respective mounting units ($P_A$, $P_B$, $P_H$).

Fixed to base plate ($Bp_6$) are a plurality of T-shaped tracks ($J_{61}$, $J_{62}$, $J_{63}$, $J_{64}$) each of which is provided with respective grooves ($N_{61}$, $N_{62}$, $N_{63}$, $N_{64}$). Spheres (not illustrated) fixed to the underside of mounting units ($P_A$, $P_B$, $P_H$) can be releasably and alternatively engaged with said grooves ($N_{61}-N_{64}$) to provide each plane surface (A,B) and reflector ($H_6$) with respective three-point supports that assure stability and reproducibly accurate positioning. (NOTE: Appropriate tracks are provided also beneath the reflector mounts ($P_A$, $P_B$, $P_H$) in the positions as illustrated; however, they are hidden by the reflector mounts ($P_A$, $P_B$, $P_H$) and hence are not shown.)

In order to interchange the incident angles ($\alpha_6$, $\beta_6$), the reflector mount ($P_A$) supporting the first plane surface ($A_6$) is moved to track ($J_{61}$) and reflector mount ($P_B$), which supports the second plane surface ($B_6$), is placed on track ($J_{64}$). The reflector mount ($P_H$) supporting the interferometer reflector ($H_6$) is also moved, being placed on track ($J_{63}$).

In order to measure the wavefront disturbance of the empty interferometer, both plane surfaces ($A_6$, $B_6$) are removed from the interferometer's measuring-beam path, and reflector ($H_6$) is placed on track ($J_{62}$).

Each of the reflector mounts ($P_A$, $P_B$) for both plane surfaces ($A_6$, $B_6$) is provided with a micrometer screw ($M_A$, $M_B$) which permits shifting each plane surface ($A_6$, $B_6$) in the drawing plane and parallel to its respective plane surface ($A_6$, $B_6$).

After both plane surfaces ($A_6$, $B_6$) have been tested absolutely, the interferometer may be calibrated by inserting one of the two plane surfaces ($A_6$, $B_6$) in place of measuring-beam reflector ($H_6$). However, when using the Fizeau-interferometer embodiment, such calibration may be a problem in that the plane surfaces ($A_6$, $B_6$) being tested require the highest possible reflection coefficent to assure that high-contrast interferograms will be recorded. Also, for the same reason, the interferometer reflector ($H_6$) should have only a low reflection coefficient.

This problem can be solved if the second plane surface ($B_6$) is divided into alternating opaque and reflective bars. The reflective bars should be wider than the opaque bars. For absolute testing, the plane surface ($B_6$) is tested in the zero order of diffraction. It will exhibit a high reflection coefficient. In order to calibrate the interferometer, when plane surface ($B_6$) replaces interferometer reflector ($H_6$), it is arranged on a pivot in such a manner that light reflected in the ± first order of diffraction passes through the spatial frequency filter ($F_6$). The reflection coefficient of the ± first order of diffraction is considerably lower than the reflection coefficient of the zero order of diffraction.

Wavefront disturbances caused by dividing errors can be eliminated in that a first measurement is carried out in the + first order of diffraction and a second measurement in the − first order of diffraction.

FIGS. 1a to 1c and FIG. 2 show light paths arranged in such a manner that symmetrical testing conditions exist for both plane surfaces (A, B, $A_6$, $B_6$). In case symmetrical testing conditions are not desired, the interferometer reflector (H, $H_6$) may be provided as close to the second plane surface (B, $B_6$) as possible. A telescope, which may be inserted between the beam splitter (S, $S_6$) and the camera sensor (K, $K_6$), can be used to generate an image of the second plane surface (B, $B_6$) on camera sensor (K, $K_6$) in order to test said second plane surface (B, $B_6$) with greater precision.

I claim:

1. A method for the absolute testing of plane surfaces using an interferometer having a beam splitter for dividing coherent light into a reference beam and a measuring beam, a reference reflector and a measuring reflector for reflecting, respectively, said reference and measuring beams, and a sensor for recording interference occurring between said reflected beams, said method comprising the steps of inserting two plane surfaces to be tested (A,B) in the path of the measuring beam between said splitter and said measuring reflector so that said measuring beam is reflected by each respective plane surface (A,B) at a different respective angle of incidence $(\alpha,\beta)$, and recording the interferences occurring between said reference and measuring beams;

changing at least one of said respective angles of incidence $(\alpha)$, and recording the interferences occurring between said reference and measuring beams; and computing from said recorded interferences the topography of at least one of said two plane surfaces (A,B).

2. The method according to claim 1 wherein said changing step further comprises changing the angles of incidence $(\alpha,\beta)$ of both plane surfaces (A,B).

3. The method according to claim 1 wherein said incident angles $(\alpha,\beta)$ are selected so that the cosine of one of said incident angles $(\alpha)$ of one plane surface (A) is an integral multiple of the cosine of the other incident angle $(\beta)$ of the other plane surface (B).

4. The method according to claim 3 wherein the cosine of the one said incident angle $(\alpha)$ is double the cosine of the other incident angle $(\beta)$.

5. The method according to claim 2 wherein said changing of said incident angles comprises interchanging said angles $(\alpha,\beta)$.

6. The method according to claim 1 comprising the further step of shifting at least one plane surface (A,B) in the incident plane perpendicular to the normal to its surface.

7. The method according to claim 6 wherein said shifting step further comprises shifting the plane surface (A) with the smaller incident angle $(\alpha)$ in its said incident plane.

8. The method according to claim 7 wherein said sensor for recording the interferences between said reference and measuring beams includes a dot-matrix grid formed by a plurality of pixels separated each from the other by a predetermined pitch, and wherein the plane surface (A) having the smaller incident angle $(\alpha)$ is shifted twice in said incident plane, each said shift being over a distance which is an integral of said pixel pitch.

9. The method according to claim 8 wherein said changing step further comprises interchanging said angles of incidence $(\alpha,\beta)$, and wherein the other plane surface (B), which has the smaller incident angle $(\alpha)$ after said interchange, is also shifted twice in its said incident plane, each said shift being over a distance which is an integral of said pixel pitch.

10. The method according to claim 9 comprising the further steps of recording a first interferogram prior to said insertion of the plane surfaces (A,B) to be tested;

recording a second interferogram following the insertion of said plane surfaces (A,B);

recording a third and fourth interferogram, respectively, following each said shifting of the plane surface arranged initially to have the smaller incident angle $(\alpha)$;

recording a fifth interferogram after said interchange of the incident angles $(\alpha,\beta)$ of both plane surfaces (A,B); and recording a sixth and seventh interferogram, respectively, following each said shifting of the plane surface arranged to have the smaller incident angle $(\alpha)$ following said interchange of incident angles;

said computing step further comprising:

computing a spatially-resolved image of the phase relation of the interfering light from the intensity distributions at each of a predetermined number of points on each of the interferograms;

deducting the phase relation of the first interferogram for each of said points from the phase relation of each of said points for each of said other six interferograms; and computing from the phase relations of said spatially-resolved images of said other six interferograms an image having the topography of each of said two plane surfaces (A,B).

11. The method according to claim 1 wherein said interferometer is a Fizeau interferometer.

12. An interferometer for carrying out the method according to claim 6 having a base plate ($BP_6$) on which is mounted a source of coherent light ($L_6$), a beam splitter ($S_6$) for directing said light along a reference-beam path and a measuring-beam path, a reference reflector ($I_6$) for reflecting light directed along said reference beam path, a measuring reflector ($H_6$) for reflecting light directed along said measuring-beam path, and a sensor ($K_6$) for recording interferograms of the interference occurring between said reflected beams, and also having a computer ($R_6$) for analyzing said interferograms, said interferometer comprising:

first and second mounting units ($P_A$, $P_B$) for carrying, respectively, a pair of plane surfaces ($A_6$, $B_6$) to be tested;

a third mounting unit ($P_H$) for carrying said measuring reflector ($H_6$);

first track means ($J_{61}$) fixed to said base plate ($BP_6$) for alternatively receiving and securing said first mounting unit ($P_A$) in at least two different locations in said measuring-beam path to position said first plane surface ($A_6$) at different incident angles $(\alpha,\beta)$ to light directed along said path;

second track means ($J_{64}$) fixed to said base plate ($BP_6$) for alternatively receiving and securing said second mounting unit ($P_B$) to position said second plane surface ($B_6$) in at least two different respective locations in the path of light deflected by said first plane surface ($A_6$);

further track means ($J_{62}$, $J_{63}$) fixed to said base plate for alternatively receiving and securing said third mounting unit ($P_H$) for positioning said measuring reflector ($H_6$); and adjusting means ($M_A$) cooperating with said first mounting unit ($P_A$) for shifting said first plane surface ($A_6$) in the incident plane perpendicular to the normal of said first plane surface.

13. The interferometer of claim 12 further comprising:

further adjusting means ($M_B$) cooperating with said second mounting unit ($P_B$) for shifting said second plane surface ($B_6$) in the incident plane perpendicular to the normal of said second plane surface.

14. An interferometric method for the absolute testing of plane surfaces in an interferometer having a source of coherent light, a beam splitter for dividing said light into a reference beam and a measuring beam, a reference reflector for reflecting said reference beam, a measuring reflector for reflecting said measuring beam, and a sensor for recording interference occurring between said reflected beams, said method comprising the steps of recording the interferences occurring between said reference and measuring beams when said plane surfaces to be tested are not present in the interferometer;

inserting two plane surfaces to be tested in the path of the measuring beam between said splitter and said measuring reflector so that said measuring beam is deflected sequentially by each respective plane surface at a respective angle of incidence, said reference and measuring reflectors remaining at the same relative distances in respect to each other, and recording the interferences occurring between said reference and measuring beams;

changing at least one of said respective angles of incidence, and recording the interferences occurring between said reference and measuring beams; and computing from said recorded interferences the topography of at least one of said two plane surfaces (A,B).

* * * * *